United States Patent [19]

Beesley

[11] Patent Number: 4,808,232

[45] Date of Patent: Feb. 28, 1989

[54] SEPARATION AND PURIFICATION OF CYCLODEXTRINS

[75] Inventor: Thomas E. Beesley, Towaco, N.J.

[73] Assignee: American Maize-Products Company, Stamford, Conn.

[21] Appl. No.: 938,821

[22] Filed: Dec. 8, 1986

[51] Int. Cl.[4] .................. C13D 3/14; B01D 15/08
[52] U.S. Cl. .................. 127/46.3; 127/46.1; 127/38; 127/55; 210/679; 210/691; 210/692; 536/103; 514/58
[58] Field of Search .......... 127/46.1, 46.2, 46.3, 127/55, 38, 40; 210/679, 691, 692; 536/103; 514/58

[56] References Cited

U.S. PATENT DOCUMENTS

| | | | |
|---|---|---|---|
| 3,420,788 | 1/1969 | Solms | 536/103 |
| 4,303,787 | 12/1981 | Horikoshi et al. | 536/103 |
| 4,384,898 | 5/1983 | Okada et al. | 127/46.3 |
| 4,418,144 | 11/1983 | Okada et al. | 536/103 |
| 4,539,399 | 9/1985 | Armstrong | 536/103 |

Primary Examiner—H. M. S. Sneed
Assistant Examiner—Chung K. Pak
Attorney, Agent, or Firm—Lucas & Just

[57] ABSTRACT

A method for separating and purifying cyclodextrins is disclosed. This method is also able to sequentially separate alpha, beta and gamma cyclodextrins. The method entails forming a matrix with an inclusion compound bound thereto and passing an aqueous solution containing cyclodextrin through the matrix and eluting the cyclodextrins in a sequential order. The inclusion compound bound to the matrix determines the order in which the cyclodextrins are eluted.

9 Claims, 7 Drawing Sheets

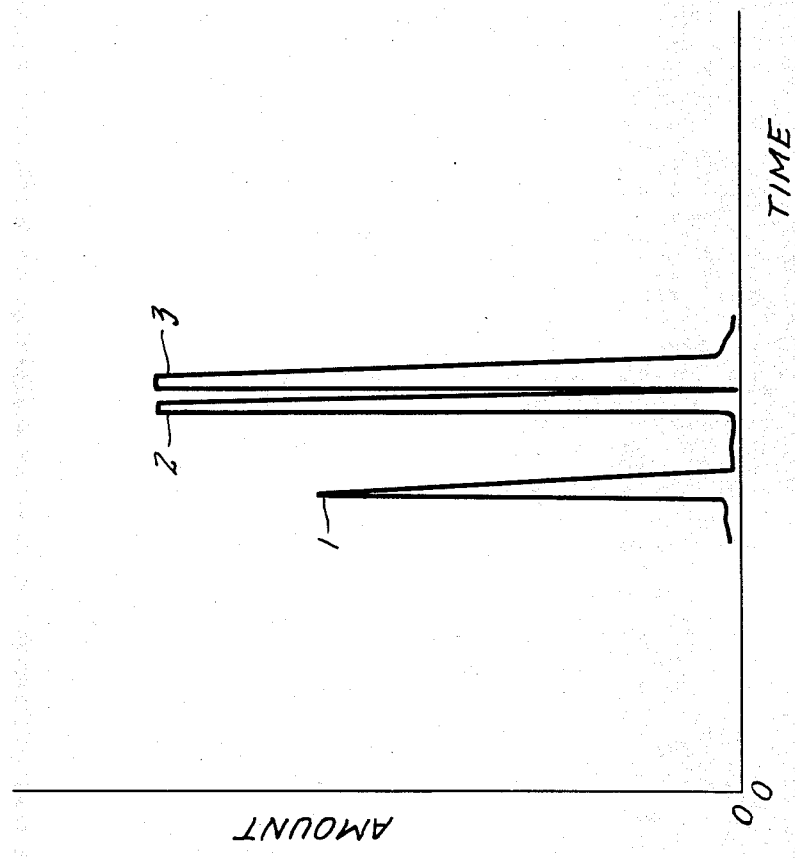

SEPARATION AND PURIFICATION OF CYCLODEXTRINS

This invention relates to the separation to the separation and purification of cyclodextrins from solution and more specifically to a process for separating and purifying alpha, beta and gamma cyclodextrins from solution using a matrix onto which an inclusion compound has been bonded.

Starch is a polymer of anhydroglucose that occurs naturally in a variety of plants such as corn, potato, sorghum, rice, etc.

When the polymer takes the physical form of a straight chain the polymer is referred to as amylose, whereas, when the polymer is branched, it is referred to as amylopectin. Generally, starch contains both amylose and amylopectin molecules. The action of an enzyme called cyclodextrin glycosyltransferase upon starch produces cyclodextrins.

Cyclodextrins, also called Schardinger dextrins, cycloamylases, cyclomaltoses and cycloglucans, are polymers of anhydroglucose units in the form of a ringed structure. A ring of six anhydroglucose units is called alpha cyclodextrin while a seven and eight membered ring are referred to as beta and gamma cyclodextrin, respectively.

Cyclodextrins are produced by treating starch or liquefied starch with an enzyme, cyclodextrin glycosyltransferase (CGT), at the appropriate pH, temperature, and time for the selected CGT. The starch may be from any selected plant variety. The enzyme CGT is obtained from microorganisms such as *B. macerans, B. megaterium, B. circulans, B. stearothermophilus* and Bacillus sp. (alkaliophilic), as well as others. The parameters for the reaction between the selected CGT and the selected starch are conventional and well described in the literature. Conventionally, the starch is slurried in aqueous solution at a concentration up to about 35% by weight solid. It is then subjected to gelatinization and liquefaction by enzyme or acid to below about 2.0 DE, preferably by enzyme. The preferred enzyme for liquefaction is bacterial alpha amylase. After deactivating the liquefying enzyme by either heat or acid, the solution is treated with a selected CGT at the pH, temperature, and time of the treatment that is optimal for the selected CGT. Generally, the action of CGT on starch to produce cyclodextrins takes place at a pH between about 4.5 to 8.5, at a temperature of about ambient to 75° C., and for about 10 hours to seven days. The amount of individual alpha, beta, and gamma cyclodextrins produced by the action of CGT on the starch will vary depending on the treatment conditions and CGT selected.

Cyclodextrins have a wide variety of uses in medicines, agricultural chemicals, cosmetics, and foods, as well as many new applications yet to be discovered. These uses occur because of the natural ability of the cyclodextrin to act as a host molecule and incapsulate other chemical compounds. The incapsulated compound is referred to as a guest molecule.

Heretofore the methods of separating cyclodextrins from solution using a matrix has been limited and generally unable to sequentially separate the cyclodextrins from themselves.

U.S. Pat. No. 4,303,787 issued Dec. 1, 1981 to Horikoshi et al. relates to a process for separating cyclodextrins from an aqueous solution containing cyclodextrins and reducing sugar using a matrix made from a porous hydrophobic resin without functional radicals of an ion exchange resin. Such resins include a styrene-divinyl benzene copolymer, ethyl-vinyl benzene copolymer, fluoroplastics, silicone resins, polyolefinic resins, and the like. No sequential separation of cyclodextrins is disclosed.

U.S. Pat. No. 4,384,898 issued May 24, 1983 to Okada et al. relates to a process for separating cyclodextrins from an aqueous solution containing cyclodextrin and glucose using a matrix made from an alkali or alkaline earth metal salt of a strongly acidic cationic exchange resin where the exchange resin is a cross linked styrene-divinyl benzene copolymer having sulfonyl groups. No sequential separation of cyclodextrins is disclosed.

U.S. Pat. No. 4,418,144 issued Nov. 29, 1983 to Okada et al. relates to a two step separation process where the first step utilizes the matrix of the '898 patent to separate the cyclodextrins from glucose and in a second subsequent step uses a gel resin to separate gamma cyclodextrin from alpha and beta cyclodextrin. This is the only reference which has the ability for separation of one cyclodextrin from another and, as disclosed, is limited to gamma cyclodextrin.

The use of diethylaminoethyl cellulose complexed with sodium borate has been used; however, the results obtained were unsatisfactory and are not included within the scope of the claims of the present invention.

It has now been discovered that by passing an aqueous solution containing cyclodextrins through a matrix upon which an inclusion compound has been bound, not only can the cyclodextrins be separated from the solution but also the separation can be such that the alpha, beta, and gamma cyclodextrins are sequentially eluted such that the alpha, beta, and gamma cyclodextrins are separated from each other.

Broadly, the present invention comprises the steps of passing an aqueous solution containing cyclodextrins through a matrix upon which an inclusion compound is bound and eluting the cyclodextrins thereafter.

The matrix upon which the inclusion compound is bound should be water insoluble and present a stable particle formation such that it is able to withstand the dynamic flow condition. Additionally, the matrix should have a high purity and have the ability to be sterilized. This purity and sterilization aspect are especially applicable when dealing with cyclodextrins which are to be used for foods, cosmetics, and drugs. The matrix must also be susceptible to modification in that it must be able to have the inclusion compound bound thereto.

Specific examples of the matrices include silicas, celluloses, polyacrylamide gels, styrene divinyl benzene beads, polyacrylate beads, polystyrene beads and derivatives thereof having the foregoing characteristics. Commercial brands of these matrices include DOWEX 1 and INDION A3.

Inclusion compounds are compounds which form a host-guest relationship between an aqueous solution of the cyclodextrin and the inclusion compound. It is known that different compounds have differing affinities for cyclodextrins as a guest within the host cyclodextrin. The affinity between the inclusion compound and any cyclodextrin must not be so great as to prevent the cyclodextrin from being eluted from the matrix. By utilizing varying affinity, it has been shown that the order in which the cyclodextrins are eluted can be controlled and it is this varying affinity that causes the sequential elution of the alpha, beta, and gamma cyclodextrins.

Specific inclusion compounds include, for example, any aromatic or aliphatic ring structure having, for example, 5, 6, 7, or 8 members, such as cyclohexane, cyclopentadiene, benzene, norborane, camphor, 1,5-cyclooctadiene; multiple aromatic ring structures such as naphthalene, anthracene, 1,2,3-benzotriazole, pyrene; as well as inorganic ions such as chloride, iodide; additionally, compounds such as benzoic acid, p-nitro benzoic acid, naphthanoic acid, phenyl acetic acid also work. These inclusion compounds can be modified, such as by placing a methyl or ethyl group on say the ortho, meta, or para position of one of the aromatic ringed inclusion compounds.

It is preferred that an inclusion compound used for separating out alpha cyclodextrin from the outer cyclodextrins present the cyclodextrin with a maximum outer diameter comparable to the cavity diameter of the alpha cyclodextrin, about five (5) to six (6) Å. For beta cyclodextrins, it is preferred that the inclusion compound present the cyclodextrin with a maximum outer diameter comparable to the cavity diameter of the beta cyclodextrin, about seven (7) to eight (8) Å. For gamma cyclodextrins, preferably the inclusion compound presents the cyclodextrin with a maximum outer diameter comparable to the cavity diameter of the gamma cyclodextrin, about nine (9) to ten (10) Å.

It has been discovered that the inclusion phenomena are both chemical and physical. The exact position of the inclusion compound will vary the affinity between the cyclodextrin and the inclusion compound. The position of the inclusion compound is varied by varying the bond angle as well as length between the inclusion compound and the matrix. For example, when using sodium naphthyl sulfonate, if the naphthyl sulfonate group is bonded to the matrix at the one position, the inclusion compound shows a similar affinity for gamma cyclodextrin and beta cyclodextrin, however, when the naphthyl sulfonate group is bonded to the matrix at the two position, the inclusion compound shows a stronger affinity for beta cyclodextrin over the gamma cyclodextrin. The length of the bond is discussed below.

When bonding the inclusion compound to the matrix, it is preferred that the inclusion compound be positioned a distance from the actual surface of the matrix so that the guest-host relationship between the inclusion compound and the cyclodextrin is not interfered with. It is preferred that the distance be about equal to about four (4) to twelve (12) single bonded carbon atoms bonded in a chain typical of saturated aliphatic carbon compounds. Best results have been obtained when the distance is equal to about six (6) carbon atoms. This distance allows the inclusion compound to function without being interfered with by the matrix. In terms of metric units, this distance is about six (6) to eighteen (18) Å with best results obtained at about nine (9) Å. Larger distances can be used with no apparent advantage and with the disadvantage of the chain bending back on itself.

The bridging compound used to join the inclusion compound to the matrix can be any organic compound which is able to bond both to the matrix and to the inclusion compound. Generally, such bridging compounds are bifunctional, aliphatic, or aromatic compounds. Such bridging compounds include glycidoxipropyltrimethoxysilane, glycidoxipropyldimethylchlorosilane, glycidoxipropyltriethoxysilane, butyldiethylaminoethyl, butyltriethylamine and 3-phenylpropyldimethylchlorosilane. Aliphatic and aromatic compounds that are bifunctional and form a covalent bond with both the matrix and the inclusion compound are preferred.

The actual bonding between the inclusion compound and the bridging compound or matrix can be either ionic or covalent with covalent being preferred, and more preferred is a bond which is nonhydrolytic in aqueous solutions. All bonds which are nonhydrolytic in aqueous solutions are covalent bonds but not all covalent bonds are nonhydrolytic in aqueous solutions. The bonding between the bridging compound and the matrix is covalent. The bonding to the inclusion compound must be such that the inclusion compound is not dissolved or eluted during the process of the present invention and such that it withstands the dynamic flow conditions. If the matrix needs regeneration due to loss of the inclusion compound, such can readily be accomplished following standard procedures.

The chemistry of forming the matrix with the inclusion compound bonded thereto is well-known and will vary depending on the chosen matrix, bridging compound, and inclusion compound. A preferred method for bonding a silane onto a matrix is taught by U.S. Pat. No. 4,539,399 issued Sept. 3, 1985 to Armstrong.

It is important that after the matrix has been formed with the inclusion compound bonded thereto, it be washed to remove any excess inclusion compound or bridging compound. Any loose inclusion or bridging compound might tend to interact with the cyclodextrins and prevent recovery and separation of the cyclodextrins. It is preferred to wash with water.

It has been found that the following combinations of matrix, inclusion compound, and bridging compounds are especially suited for the present invention: silica, glycidoxipropyltrimethoxysilane and inclusion compounds of naphthol, phenylpropanol and benzylalcohol; silica, butyldiethylaminoethyl and inclusion compounds of naphthoic acid, phenylacetic acid and cinnamic acid; silica, butyltriethylamine and inclusion compounds of naphthoic acid and phenylpropylacetic acid.

In order to pass the cyclodextrin containing solution through the matrix, it is preferred to place the matrix into a container that immobilizes the matrix and allows the cyclodextrin-containing solution to pass through the matrix. Typically, a column is used. Other suitable processes include fixed bed, moving bed, or simulated moving bed processes.

When using an inclusion compound which is specific to one of the cyclodextrins, it is preferred that a multiple of matrices, each one having a different inclusion compound bonded thereto, be used in a series of separations. Typically, three columns are used, each with a different packing being specific to a specific cyclodextrin. This allows for optimal separation, especially on a large scale operation.

The solution obtained from treating starch with CGT contains not only cyclodextrins but also unreacted starch granules, dextrins, reducing sugars, and the like, as well as branched cyclodextrins and cyclodextrins. The aqueous solution which contains cyclodextrins includes a solution which contains all of the above-mentioned components and is obtained by treating an aqueous solution of starch with CGT to form cyclodextrins.

It is preferred that when the cyclodextrin solution contains unreacted starch granules and larger dextrins these larger molecules be filtered off; however, such is not necessary, The purpose of the filtering is to effect the flow of the aqueous solution containing cyclodextrins. The larger the molecules in the solution, the slower the flow through the matrix.

Typically, the solution containing cyclodextrins which is passed through the matrix onto which the inclusion compound is bound will already have had the beta cyclodextrin removed. Generally, beta cyclodextrin is removed by precipitation. The precipitation of beta cyclodextrin from a solution containing cyclodextrins is well described in the literature.

Additionally, the solution containing cyclodextrin may be treated with a glucoamylose to convert all or the majority of the acyclic molecules to glucose.

It also may be of some advantage to first separate the cyclodextrins from solution using the method and apparatus of the '787, '898 and '144 patents and then use the present invention to sequentially separate the cyclodextrins from one another.

The process of the present invention is carried out under ambient pressure and temperature with the pH of the solution preferably being in a neutral range.

For a covalently bonded inclusion compound the full pH range is employed. For an ionically bonded inclusion compound it is preferable that the pH be in the range of 5 to 7 with best results around 5.5.

The temperature can range between about 0° to 100° C. with the preferred temperature being ambient. Some advantage has been found by adding heat, above ambient, to the process. Heat generally decreases the stability of the guest host complex and tends to increase the rate at which the cyclodextrins are eluted from the column. For alpha and gamma, the preferred elevated temperature range was about 60° C. while for beta it was about 80° to 100° C. Heat can be added in a number of ways. For example, when using a column to immobilize the matrix, the column may be jacketed and a heating medium circulated through the jacket to heat the process. Alternatively, the wash water or the mother liquor itself may be heated. Some advantage to flow rate of the solution through the matrix is found at temperature above ambient and typically the solution will still be warm after having just finished treatment with CGT.

Generally, water was used to follow the addition of the cyclodextrin mother liquor to the column. Some advantage is found by using a mixture of alcohol and water to separate the cyclodextrin from the inclusion compound. Any lipophilic solvent, such as alcohol, can be used and preferably ethanol is used because of its lack of toxicity. Good results have been obtained with an elution of 95% water and 5% ethyl alcohol.

BRIEF DESCRIPTION OF THE DRAWINGS

These and other aspects of the present invention may be more fully understood with reference to the following examples wherein:

FIGS. 4 and 5 are elution patterns from columns packed with silica gel which has a bridging compound and a quaternary amine function onto which an inclusion compound of 1-naphthyl sulfonate is bound. FIG. 4 is at a flow rate of 1.0 ml/min. while FIG. 5 is at a flow rate of 0.5 ml/min.;

EXAMPLE 1

Figure 2:
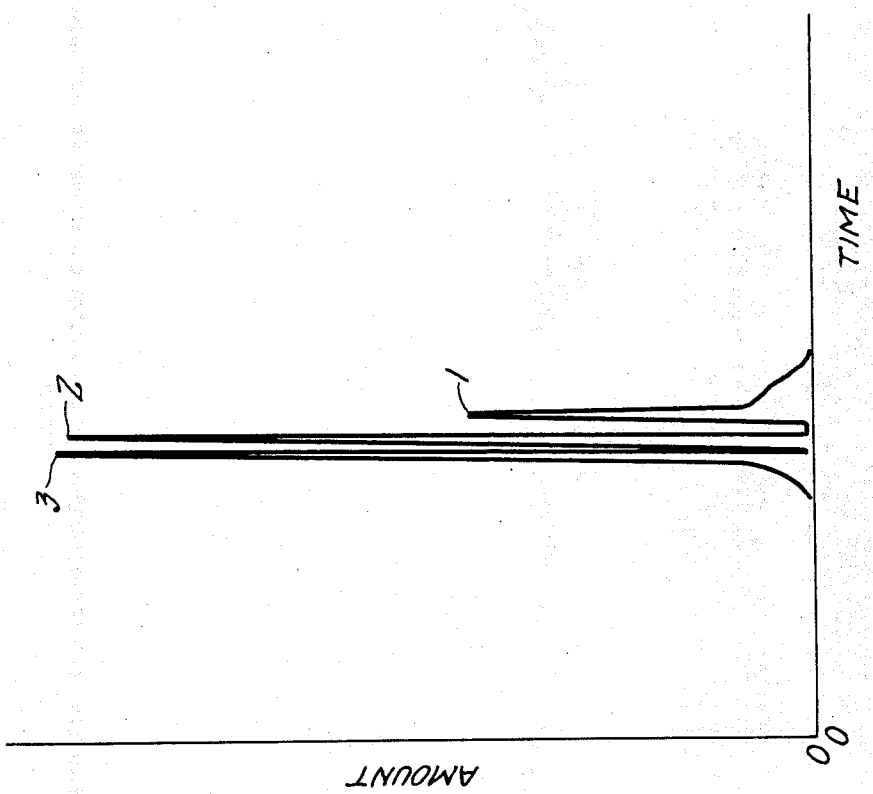
FIG. 2 is an elution pattern from a column packed with silica gel which has a bridging compound and a quaternary amine function onto which an inclusion compound of iodide is bound.

This example illustrates the preparation of a solution containing cyclodextrin.

To 40 g of prehydrolyzed potato starch a small amount of cold water was added to form a pourable slurry. The starch was obtained from J. T. Baker Co., Philipsburg, N.J. This slurry was added to 400 ml of boiling water which was then stirred for one hour. After the hour, 200 mg of calcium chloride hydrate was added to the solution along with 1 ml of purified cyclodextrin glycosyl transferase (100,000 units, CGT) and the solution was held at 55° C. for 48 hours. The CGT was obtained from Diagnostic Chemicals Limited.

After the treatment of the starch slurry with CGT, a 1 ml of the resulting solution was drawn and analyzed by HPLC to show typically 30–50% conversion to cyclodextrin and in a proportion of 4–7% alpha cyclodextrin, 5–9% gamma cyclodextrin, and 35–50% beta cyclodextrin.

The solution was then cooled to about 10° C. and held there for about 4 hours while the majority of the beta cyclodextrin was precipitated out of solution.

After the precipitation and removal of beta cyclodextrin the remaining solution was concentrated by reducing the volume by 50% to produce a mother liquor rich in alpha and gamma cyclodextrin with only a small amount of beta cyclodextrin. Typically, the reduction in volume was accomplished by evaporation.

Thus, a typical mother liquor was prepared and had the following percent by weight of components:

TABLE 1

| Component | Percent by Weight of Total Liquor |
|---|---|
| Alpha cyclodextrin | 18 |
| Beta cyclodextrin | 5 |
| Gamma cyclodextrin | 24 |

EXAMPLE 2

This example illustrates the preparation of a matrix upon which an inclusion compound was bound as well as the packing of a column to hold the matrix.

A slurry of 10 g of 80 Å spherical silica gel was prepared in 60 ml of toluene. To this slurry was added 6.0 ml of 3-bromopropyltrichlorosilane and the slurry was stirred for 30 minutes and held at 70° C. After this, 20 ml of 3-(3-diethyl)aminopropylamine and 0.6 ml water was added and then refluxed for 2 hours. The mixture was cooled, filtered, washed first with methanol, second with a 1:1 mixture of water and methanol, and finally with straight methanol. Then the matrix was oven dried.

The matrix was removed from the oven and mixed with methyl iodide to quaternize the amino groups. Finally, the matrix is washed with methanol. This finishes attaching the bridging compound to the matrix.

Next, the matrix was packed into a typical HPLC column measuring 250 mm height and 4.6 mm inside diameter.

In order to bond the inclusion compound to the matrix, first the column was stripped with 0.5M sodium chloride and washed with water.

Next, the column was equilibrated with a 0.1M solution of the cation form of the inclusion compound. Five different columns were prepared with five different inclusion compounds ionically bonded to the matrix. Table II below lists the cation form of the inclusion compound used in each column and the bound inclusion compound left behind after the equilibration step. Each column was thoroughly washed with water to remove all free compounds such that a stable background was obtained as measured by a refractometer.

TABLE II

| Column No. | Cation Inclusion Compound | Bound Inclusion Compound (Radical) |
| --- | --- | --- |
| 1 | Sodium benzoate | Benzoate |
| 2 | Sodium iodide | Iodide |
| 3 | Sodium phenylacetate | Phenyl acetate |
| 4 | Sodium 1-naphthyl sulfonate | 1-naphthyl sulfonate |
| 5 | Sodium 2-naphthyl sulfonate | 2-naphthyl sulfonate |

The results of each one of these columns of 250 mm length and 4.6 mm inside diameter will be discussed in the following examples.

EXAMPLE 3

This example uses Column No. 1 of Example 2 to sequentially separate cyclodextrin from a solution containing cyclodextrins. The solution containing cyclodextrins was a typical mother liquor prepared by combining substantially pure alpha, beta, and gamma cyclodextrin with starch and water. The starch was a prehydrolyzed potato starch sold by J. T. Baker Co. The solution was made from 3.6 grams of alpha cyclodextrin, 3.0 grams of beta cyclodextrin, 3.3 grams of gamma cyclodextrin, and 0.1 gram of starch in one liter of water. Twenty (20) microliters of the mother liquor was injected into the top of the column and deionized water at a rate of 1.0 ml/minute flowed through the column to elute the cyclodextrins.

From the column elution it was observed that the starch appeared at the column void. Next a clear band of gamma cyclodextrin appeared which in turn was followed by a clear band of alpha cyclodextrin and finally a clear band of beta cyclodextrin. Thus, the benzoate showed almost no affinity for the gamma, moderate for alpha and strong for beta cyclodextrin. The amount of each cyclodextrin recovered versus the amount of each cyclodextrin passed through the column is illustrated below in Table III. Table III also illustrates the conditions at which the column was run.

TABLE III

| Silica gel + benzoate Column | | |
| --- | --- | --- |
| Conditions: Pressure 600 psi Temperature ambient pH 5.5 | | |
| | Cyclodextrins IN (grams) | Cyclodextrins OUT (grams) |
| alpha | $7.2 \times 10^{-5}$ | $7.2 \times 10^{-5}$ |
| beta | $6.0 \times 10^{-5}$ | $6.0 \times 10^{-5}$ |
| gamma | $6.6 \times 10^{-5}$ | $6.6 \times 10^{-5}$ |
| starch | $2.0 \times 10^{-6}$ | $2.0 \times 10^{-6}$ |

Figure 1:
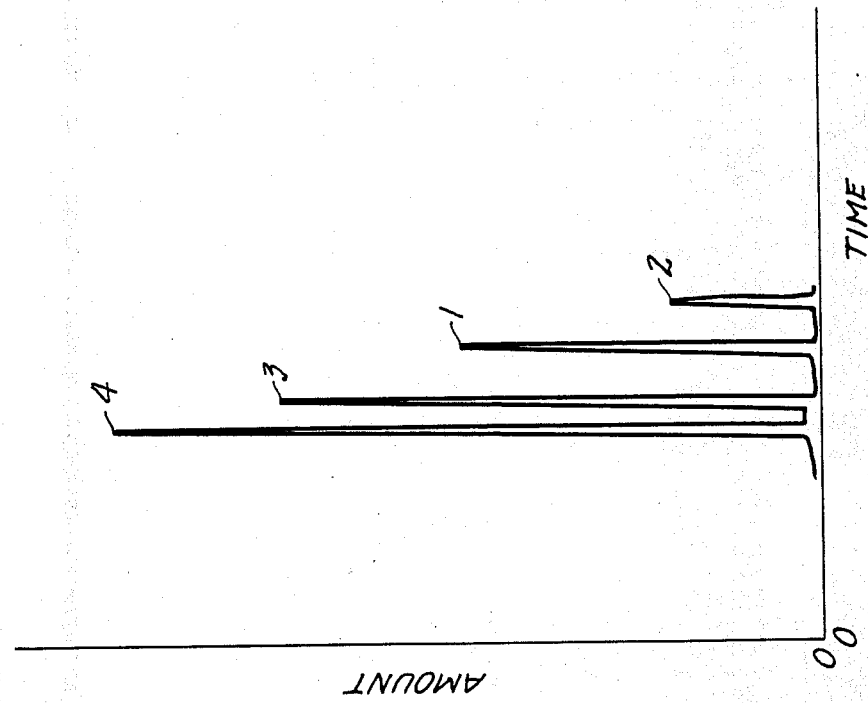
FIG. 1 is an elution pattern from a column packed with silica gel which has a bridging compound and a quaternary amine function onto which an inclusion compound of benzoate is bound.

FIG. 1 is an elution pattern representative of a chromatographic analysis of the effluent from Column No. 1. The peak labeled 1 is alpha cyclodextrin, peak 2 is beta cyclodextrin, and peak 3 is gamma cyclodextrin. The peak labeled 4 is the starch. The chromatograph was run using standard chromatographic procedures with a Shimadzu dual pump system LC4, a Knauer refractometer, and a Rheodyne injector. Characterized alpha, beta, and gamma cyclodextrins were used to standardize the chromatograph prior to the run.

This illustrates the sequential separation of cyclodextrins.

EXAMPLE 4

This example uses Column No. 2 of Example 2 to sequentially separate cyclodextrins from a solution containing cyclodextrins. The solution containing cyclodextrin was a typical mother liquor as prepared in Example 3 above, however, no starch was used and 1.0 gram alpha was combined with 4.8 grams beta and 4.0 grams gamma in 1 liter of water. Twenty (20) microliters of the mother liquor was injected into the top of the column and this was followed by deionized water at a rate of 1.0 ml/minute.

From the column it was observed that gamma cyclodextrin followed just after the void volume which in turn was followed by beta cyclodextrin and finally alpha cyclodextrin. Thus, the iodide inclusion compound showed its strongest affinity for the alpha cyclodextrin, weakest for the gamma cyclodextrin and intermediate affinity for the beta cyclodextrin. The amount of each cyclodextrin recovered versus the amount of each cyclodextrin passed through the column is illustrated below in Table IV. Table IV also illustrates the conditions at which the column was run.

TABLE IV

| silica gel + iodide Column | | |
| --- | --- | --- |
| Conditions: Pressure 600 psi Temperature ambient pH 5.5 | | |
| | Cyclodextrins IN (grams) | Cyclodextrins OUT (grams) |
| alpha | $2.0 \times 10^{-5}$ | $2.0 \times 10^{-5}$ |
| beta | $8.6 \times 10^{-5}$ | $8.6 \times 10^{-5}$ |
| gamma | $8.0 \times 10^{-5}$ | $8.0 \times 10^{-5}$ |

Thus, a sequential separation of cyclodextrins was obtained.

FIG. 2 is an elution pattern representative of a chromatographic analysis of the effluent from Column No. 2. The peak labeled 1 is alpha cyclodextrin, the peak labeled 2 is beta cyclodextrin, and the peak labeled 3 is gamma cyclodextrin.

The same chromatographic procedures as used in Example 3 above were followed in this example.

EXAMPLE 5

This example uses Column No. 3 of Example 2 to sequentially separate cyclodextrins from a solution containing cyclodextrins. The solution containing cyclodextrins was a tyical mother liquor as prepared in Example 3 above. The makeup of the solution was identical to Example 4 above. Twenty (20) microliters of the mother liquor was injected into the top of the column and deionized water followed at 1.0 ml/minute.

From the column sequential separation of the cyclodextrins was observed in the order of gamma, alpha, and beta. The gamma cyclodextrin was the first out of the column with alpha second and beta following. The phenyl acetate showed a strong affinity for beta cyclodextrin, a weak affinity for gamma cyclodextrin, and a moderate affinity for alpha cyclodextrin. The amount of cyclodextrins recovered versus the amount of each cyclodextrin passed through the column is illustrated in Table V below. Table V also illustrates the conditions at which the column was run.

TABLE V silica gel + phenyl acetate Column
Conditions: Pressure 600 psi Temperature ambient pH 5.5

| | Cyclodextrins IN (grams) | Cyclodextrins Out (grams) |
|---|---|---|
| alpha | $2.0 \times 10^{-5}$ | $1.5 \times 10^{-5}$ |
| beta | $8.6 \times 10^{-5}$ | $8.6 \times 10^{-5}$ |
| gamma | $8.0 \times 10^{-5}$ | $8.0 \times 10^{-5}$ |

Figure 3:
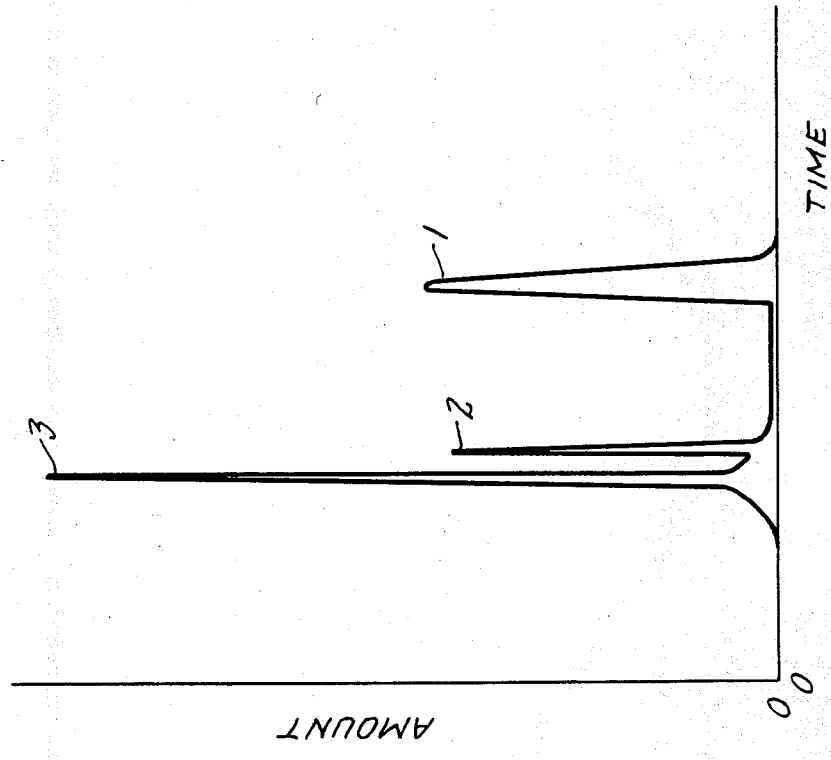
FIG. 3 is an elution pattern from a column packed with silica gel which has a bridging compound and a quaternary amine function onto which an inclusion compound of phenyl acetate is bound.

FIG. 3 is an elution pattern representative of a chromatographic analysis of the effluent from Column No. 3. The peak labeled 1 is alpha cyclodextrin, the peak labeled 2 is beta cyclodextrin, and the peak labeled 3 is gamma cyclodextrin. The chromatographic procedure used in this example was the same as was used in Example 3 above.

This illustrates the sequential separation of alpha, beta, and gamma cyclodextrins.

EXAMPLE 6

This example used Column No. 4 of Example 2 to sequentially separate cyclodextrins from a solution containing cyclodextrins. The solution containing cyclodextrins was a typical mother liquor as prepared in Example 3 above. The makeup of the solution was identical to Example 5 above. In this example two flow rates were used, in both cases twenty (20) microliters of the mother liquor was injected into the top of the column and deionized water followed at a rate of 1.0 ml/minute or 0.5 ml/minutes. Near the void volume in both cases alpha cyclodextrin appeared followed by a band of beta cyclodextrin and finally a band of gamma cyclodextrin. 1-naphthyl sulfonate showed a strong affinity for gamma cyclodextrin, weak affinity for alpha cyclodextrin, and moderate affinity for beta cyclodextrin. Table VI illustrates the conditions at which the column was run as well as the results.

TABLE VI silica gel + 1-naphthyl sulfonate Column
Conditions: Pressure 600 psi Temperature ambient pH 5.5

| | Cyclodextrins IN (grams) | Cyclodextrins OUT (grams) | |
|---|---|---|---|
| | | 1.0 ml/min. | 0.5 ml/min. |
| alpha | $2.0 \times 10^{-5}$ | $1.5 \times 10^{-5}$ | $2.0 \times 10^{-5}$ |
| beta | $8.6 \times 10^{-5}$ | $8.6 \times 10^{-5}$ | $8.6 \times 10^{-5}$ |

TABLE VI-continued silica gel + 1-naphthyl sulfonate Column
Conditions: Pressure 600 psi Temperature ambient pH 5.5

| | Cyclodextrins IN (grams) | Cyclodextrins OUT (grams) | |
|---|---|---|---|
| | | 1.0 ml/min. | 0.5 ml/min. |
| gamma | $8.0 \times 10^{-5}$ | $8.0 \times 10^{-5}$ | $8.0 \times 10^{-5}$ |

Figure 4:
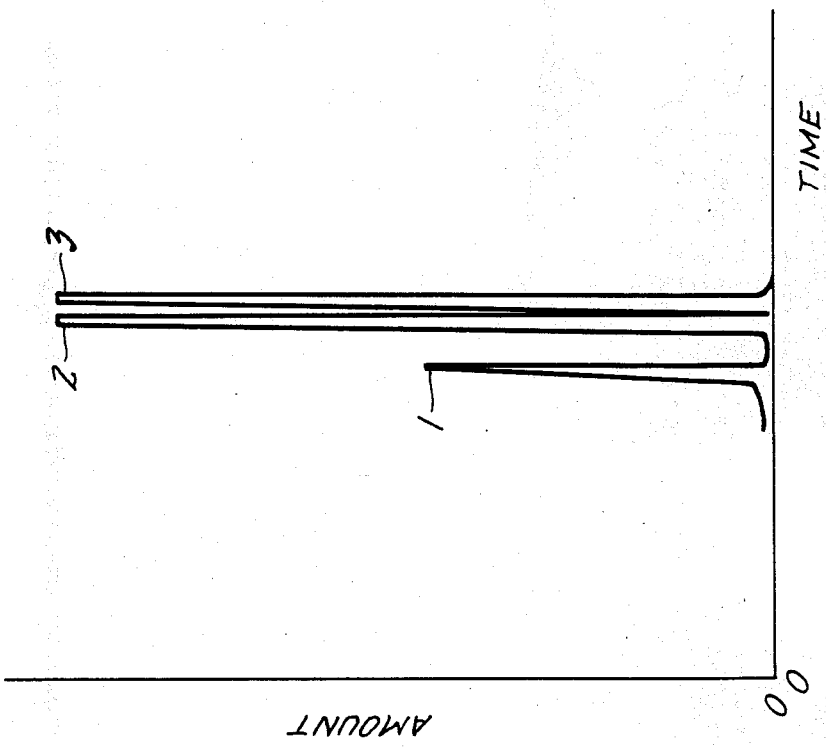

FIG. 4 is an elution pattern representative of a chromatographic analysis of the effluent from Column No. 4 at a flow rate of 1.0 ml/min. while FIG. 5 is an elution pattern representative of a chromatographic analysis of the 0.5 ml/min. flow rate. The peak labeled 1 is alpha cyclodextrin, the peak labeled 2 is beta cyclodextrin, and the peak labeled 3 is gamma cyclodextrin in both FIGS. 4 and 5. The chromatographic procedure employed in this example is the same as employed in Example 3 above.

It is readily apparent that the slower flow rate, 0.5 ml/min. of FIG. 5, allows for a larger spread between the individual peaks of the various cyclodextrins. This fact should be taken into account in any scale-up operation.

Both FIGS. 4 and 5 illustrate the sequential separation of alpha, beta, and gamma cyclodextrins.

EXAMPLE 7

This example uses the Column No. 5 of Example 2 to sequentially separate cyclodextrins from the solution containing cyclodextrins. The solution containing cyclodextrins was a typical mother liquor as prepared in Example 3 above, however, no starch was used and 0.6 gram of alpha, 4.4 grams of beta, and 4.8 grams of gamma was mixed into one liter of water. Twenty (20) microliters of the mother liquor was injected into the top of the column and deionized water followed at the rate of 1.0 ml/minute.

From the column it was observed that alpha cyclodextrin followed the void volume which in turn was followed by a band of gamma cyclodextrin and a band of beta cyclodextrin. It should be noted in this example that the gamma and beta cyclodextrins switched positions in their sequential order from that which they were eluted in Example 6 above. This is due to the orientation of the naphthyl sulfonate in the column which allows for optimization of beta cyclodextrin in the column.

Column No. 4, the naphthyl group of the inclusion compound, was bound at the one position while in Column No. 5 the naphthyl group was bound at the two position. This means that the physical position of the inclusion compound plays an integral role in the order in which cyclodextrins are eluted.

The amount of each cyclodextrin recovered versus the amount of each cyclodextrin which passed through Column No. 5 is illustrated in Table VII below. Table VII also illustrates the conditions at which the column was run.

TABLE VII silica gel + 2-naphthyl sulfonate Column
Conditions: Pressure 600 psi Temperature ambient pH 5.5

| | Cyclodextrins IN (grams) | Cyclodextrins OUT (grams) |
|---|---|---|
| alpha | $1.2 \times 10^{-5}$ | $1.2 \times 10^{-5}$ |
| beta | $8.8 \times 10^{-5}$ | $8.8 \times 10^{-5}$ |

TABLE VII-continued silica gel + 2-naphthyl sulfonate
Column
Conditions: Pressure 600 psi Temperature ambient pH 5.5

| | Cyclodextrins IN (grams) | Cyclodextrins OUT (grams) |
|---|---|---|
| gamma | $9.6 \times 10^{-5}$ | $9.6 \times 10^{-5}$ |

Figure 6:
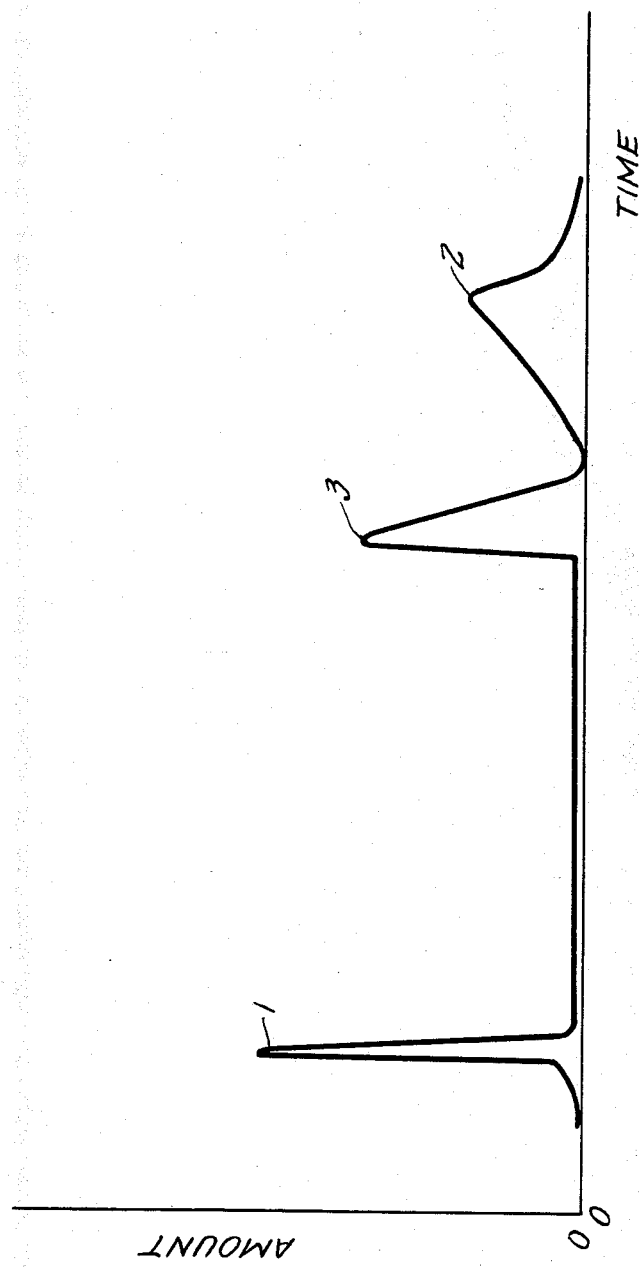
FIG. 6 is an elution pattern from a column packed with silica gel which has a bridging compound and a quaternary amine function onto which an inclusion compound of 2-naphthyl sulfonate is bound.

FIG. 6 is an elution pattern representative of a chromatographic analysis of the effluent from Column No. 5. The peak labeled 1 is alpha cyclodextrin, the peak labeled 2 is beta cyclodextrin, and the peak labeled 3 is gamma cyclodextrin. The chromatographic procedure employed in this example was the same chromatographic procedure employed in Example 3 above.

FIG. 6 illustrates the sequential separation of alpha, beta and gamma cyclodextrin.

EXAMPLE 8

This example illustrates making a column wherein the inclusion compound was covalently bonded to the matrix.

Seven (7) grams of silica gel (5 micron size) was slurried with 100 ml of toluene and then refluxed to remove any azeotrope water. The slurry was cooled to 85° C. and 1.0 ml of 3-phenylpropyldimethylchlorosilane was added to the slurry followed by 1.0 ml pyridine. The temperature of the slurry was raised to 95° C. for one hour.

A column measuring 4.6 mm by 250 mm was packed with the resulting matrix of silica gel with inclusion compound and tested with a typical mother liquor containing equal amounts of alpha, beta, and gamma cyclodextrin. Twenty (20) microliters of mother liquor was injected into the top of the column and deionized water at a flow rate of 1.0 ml/minute followed.

Near the void volume alpha cyclodextrin appeared followed by gamma cyclodextrin and finally beta cyclodextrin.

Figure 7:
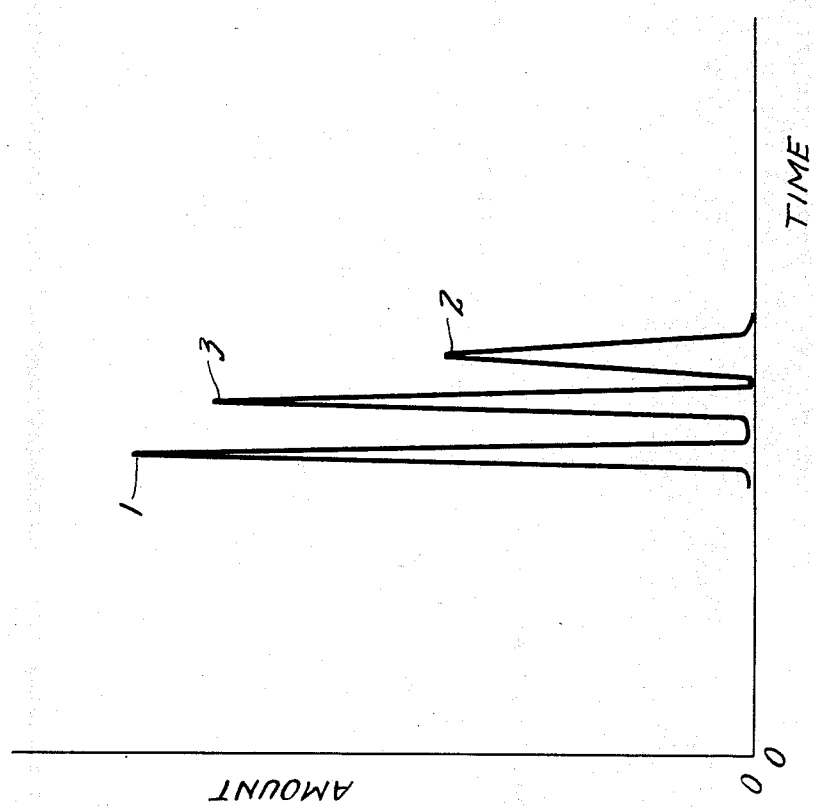
FIG. 7 is an elution pattern from a column packed with silica gel onto which an inclusion compound of 3-phenylpropyl is bound.

FIG. 7 is an elution pattern representative of a chromatographic analysis of the effluent. Peak No. 1 is alpha cyclodextrin, peak No. 2 is beta cyclodextrin, and peak No. 3 is gamma cyclodextrin. The chromatographic procedure employed in this example was the same chromatographic procedure employed in Example 3 above.

It should be noted that the covalently bonded inclusion compound provided for generally better separation than the ionically bonded inclusion compound.

EXAMPLE 9

This example illustrates the use of 2-naphthyl sulfonate ionically bonded onto an INDION A3 cellulose matrix. INDION A3 is a commercially available matrix sold by Phoenix Chemicals Ltd. This was the same inclusion compound as used in column No. 5 of Example 7 above.

The matrix with the inclusion compound bonded thereto was then packed into a column, 30 mm inside diameter by 500 mm length.

The packed column was charged with 20 ml of a mother liquor followed by deionized water at a flow rate of 20 ml/minute.

From the column elution it was observed that alpha eluted first followed by gamma and finally beta cyclodextrin. Table VIII below shows the conditions and results of three runs on this column. All runs were identical except Run No. 3 where 40 ml of mother liquor was used instead of 20 ml.

TABLE VIII cellulose + 2-naphthyl sulfonate
Column
Conditions: Pressure 10 psi Temperature ambient pH 5.5

| | Elution Volume(ml) | Retention Time(min) | Recovered CD (grams) | % Purity |
|---|---|---|---|---|
| | | Run #1 | | |
| alpha | 433 | 21 | 3.1 | 100 |
| beta | 3400 | 169 | 1.5 | 100 |
| gamma | 759 | 38 | 4.2 | 100 |
| | | Run #2 | | |
| alpha | 412 | 21 | 3.0 | 100 |
| beta | 3380 | 169 | 1.4 | 100 |
| gamma | 759 | 38 | 4.2 | 100 |
| | | Run #3 | | |
| alpha | 412 | 21 | 6.3 | 100 |
| beta | 3200 | 169 | 3.2 | 100 |
| gamma | 697 | 38 | 9.0 | 100 |

This example shows not only separation but also the ability to purify the cyclodextrins.

Figure 8:
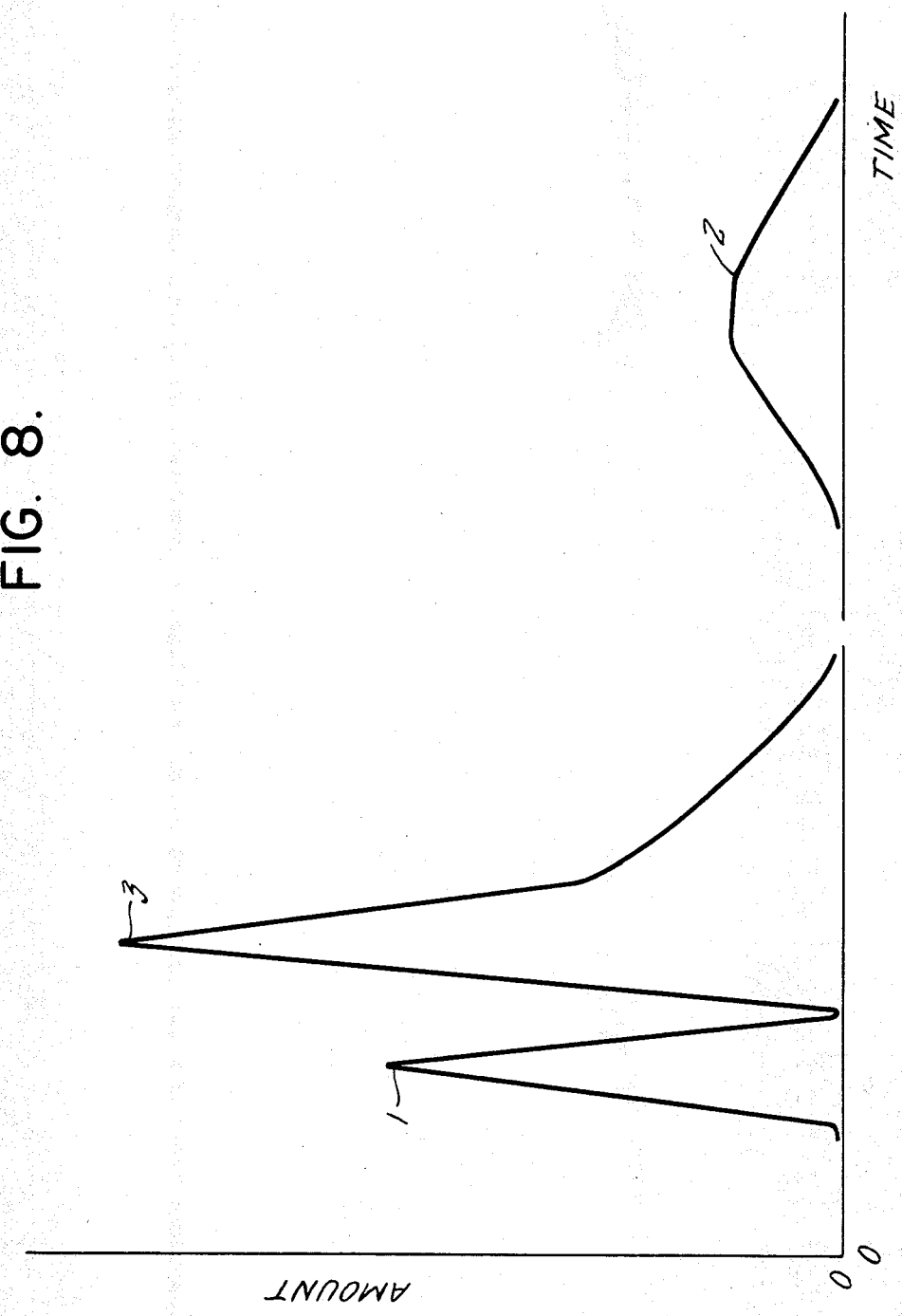
FIG. 8 is an elution pattern from a column packed with a cross-linked hydrophilic regenerated cellulose containing 1.1 mil equivalents/gram diethylaminoethyl (DEAE) functional groups INDION $A_3$ onto which an inclusion compound of 2-naphthyl sulfonate is ionically bound.

FIG. 8 is a typical elution pattern representative of a chromatographic analysis from the three runs made on this column. Peak No. 1 is alpha, peak No. 2 is beta, and peak No. 3 is gamma cyclodextrin. The chromatographic procedure employed in this example was the same chromatographic procedure employed in Example 3 above.

It can be seen that gamma was retained for almost three hours. This retention time can be decreased with the addition of heat to the column or with the addition of a solvent such as an aqueous solution of 5% ethanol to lessen the affinity between the gamma cyclodextrin and the inclusion compound.

EXAMPLE 10

This example illustrates the use of 3-phenyl propyl acetic acid covalently bonded into a matrix of DOWEX 1×4.

The matrix with the inclusion compound bonded thereto was packed into a column 30 mm inside diameter by 500 mm length. The packed column was charged with a mother liquor assayed as 16.8% by weight alpha cyclodextrin, 7.0% by weight beta cyclodextrin, and 21.5% by weight gamma cyclodextrin. The charge was injected into the column. The charge was followed by deionized water at a flow rate of 20 ml/min.

From the column elution it was observed that alpha eluted first, followed by gamma which in turn was followed by beta cyclodextrin. Table IX below shows the conditions and the results of this run.

TABLE IX

DOWEX 1 × 4 + 3-phenylpropyl acetate
Column
Conditions: Pressure 10 psi Temperature ambient pH 5.5

| | Elution Volume(ml) | Retention Time(min) | Recovery CD (grams) | % Purity |
|---|---|---|---|---|
| alpha | 200 | 8.5 | 3.1 | 100 |
| beta | 6000 | 300.0 | 1.0 | 100 |
| gamma | 600 | 30.0 | 4.3 | 100 |

DOWEX 1×4 was an ion exchange resin of a polystyrene matrix with trimethylbenzyl ammonium bonded thereto. The polystyrene was 4% cross-linked.

Figure 9:
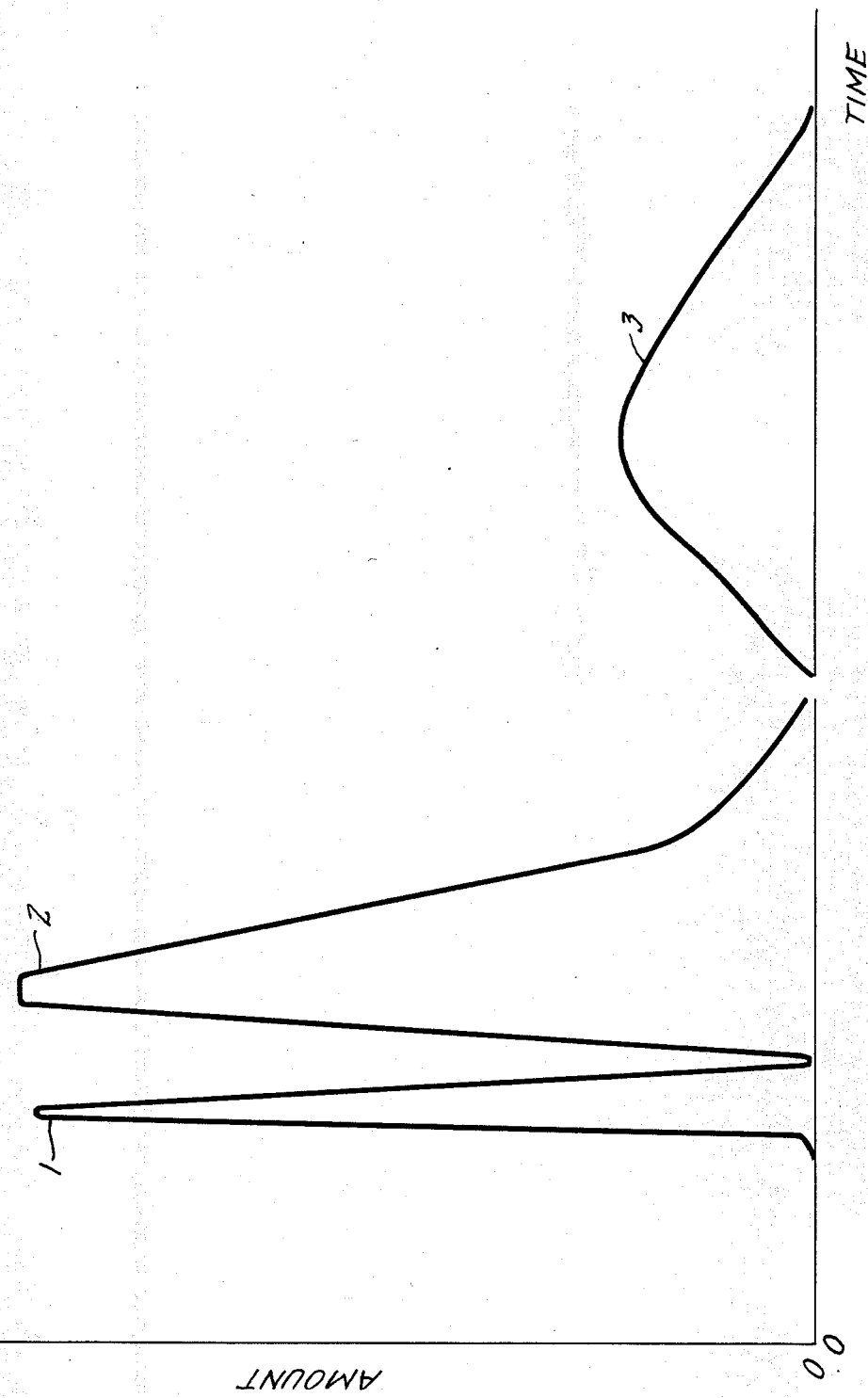
FIG. 9 is an elution pattern from a column packed with 400 mesh DOWEX 1x resin onto which an inclusion compound of 3-phenylpropyl acetate is bound.

FIG. 9 is an elution pattern representative of a chromatographic analysis of this run. Peak No. 1 is alpha, peak No. 2 is beta, and peak No. 3 is gamma. The chromatographic procedure employed in this example was the same chromatographic procedure employed in Example 3 above.

It can be seen from Table IX that beta was retained for five hours. To alleviate this long retention time, heat or a solvent such as alcohol can be used.

It will be understood that the claims are intended to cover all changes and modifications of the preferred embodiments of the invention herein chosen for the purpose of illustration, which do not constitute departure from the spirit and scope of the invention.

What is claimed is:

1. A method for sequentially separating different cyclodextrins from a solution containing said different cyclodextrins comprising the steps of:
   (a) passing the solution containing said different cyclodextrins through a matrix upon which an inclusion compound is attached by means of a bridging compound thereby positioning said inclusion compound about 6 to about 18 Å from the surface of said matrix, said inclusion compound being capable of forming an inclusion complex with said different cyclodextrins;
   (b) forming the inclusion complex between said inclusion compound and said different cyclodextrins; and
   (c) eluting sequentially said different cyclodextrins.

2. The method of claim 1 further comprising the step of heating said solution containing said different cyclodextrins prior to passing it through said matrix.

3. The method of claim 1 further comprising the step of heating said matrix and maintaining said matrix in a heated state while passing said solution of said different cyclodextrins through said matrix.

4. The method of claim 2 wherein said solution is heated to a temperature above about 60° C.

5. The method of claim 3 wherein said matrix is heated to a temperature above about 60° C.

6. The method of claim 1 wherein said solution containing said different cyclodextrins is an aqueous solution.

7. The method of claim 6 wherein water is added following said solution.

8. The method of claim 6 wherein a mixture of water and alcohol is used to elute said cyclodextrins.

9. A method for sequentially separating different cyclodextrins from a solution containing said different cyclodextrins comprising the steps of:
   (a) passing said solution containing said different cyclodextrins through a matrix upon which an inclusion compound is attached by means of a bridging compound thereby positioning said inclusion compound a distance from said matrix equivalent to about 4 to about 12 single bonded carbon atoms bonded in a chain of a saturated aliphatic carbon compound, said inclusion compound being capable of forming an inclusion complex with said different cyclodextrins;
   (b) forming the inclusion complex between said inclusion compound and said different cyclodextrins; and
   (c) eluting sequentially said different cyclodextrins.

* * * * *